Nov. 22, 1960
H. B. BARRETT
2,960,765
METHODS AND APPARATUS FOR FINISHING
BRAKE SHOES AND BRAKE DRUMS
Filed March 8, 1957
3 Sheets-Sheet 1
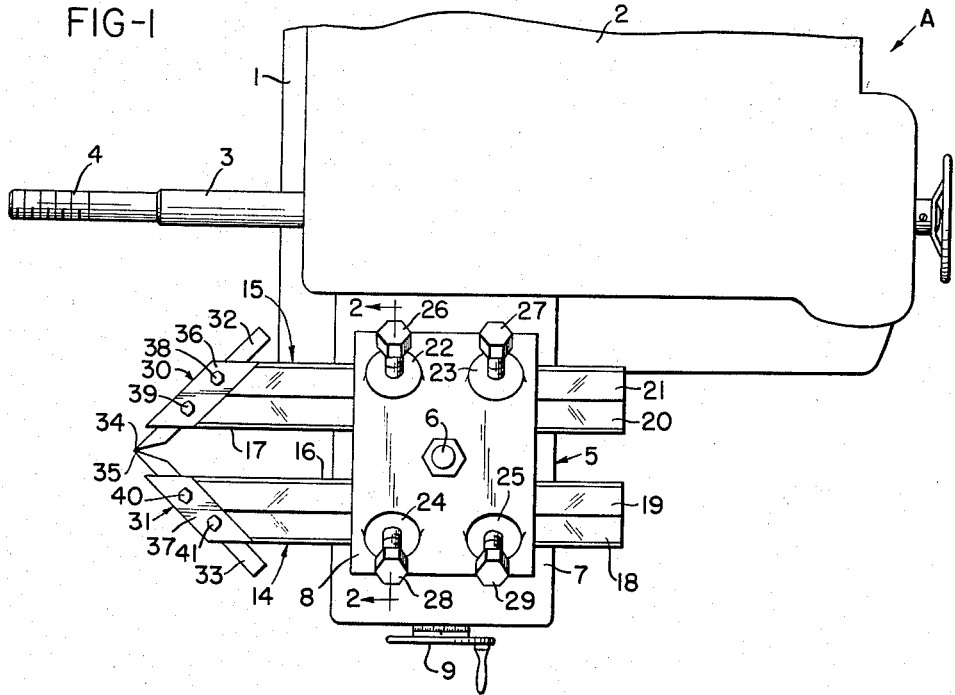
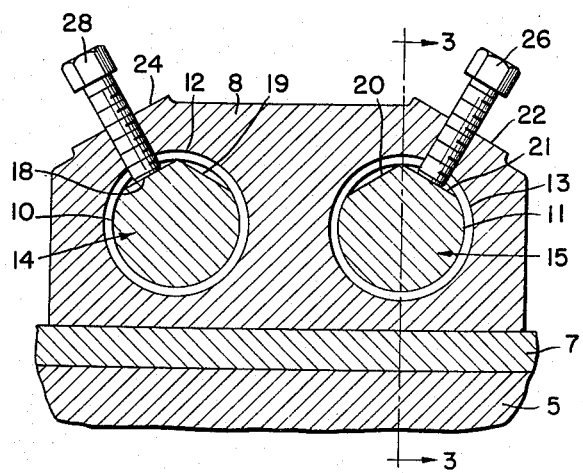
INVENTOR.
HARRY B. BARRETT
BY *Alfred W. Petchaft*
ATTORNEY Nov. 22, 1960
H. B. BARRETT
2,960,765
METHODS AND APPARATUS FOR FINISHING
BRAKE SHOES AND BRAKE DRUMS
Filed March 8, 1957
3 Sheets-Sheet 2
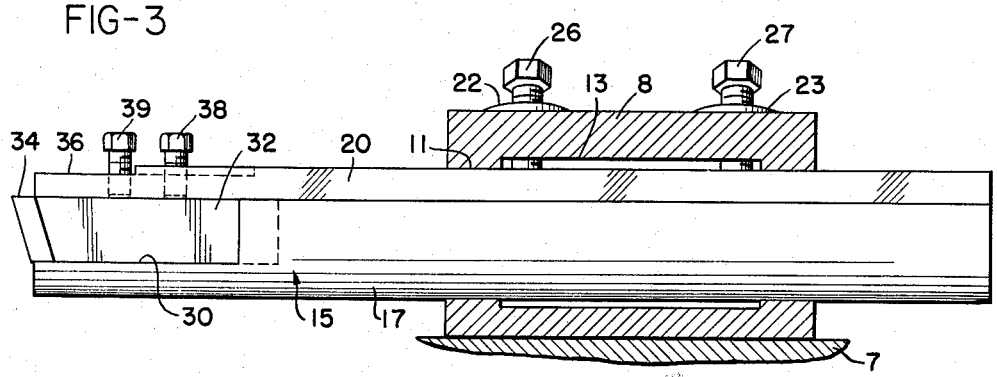
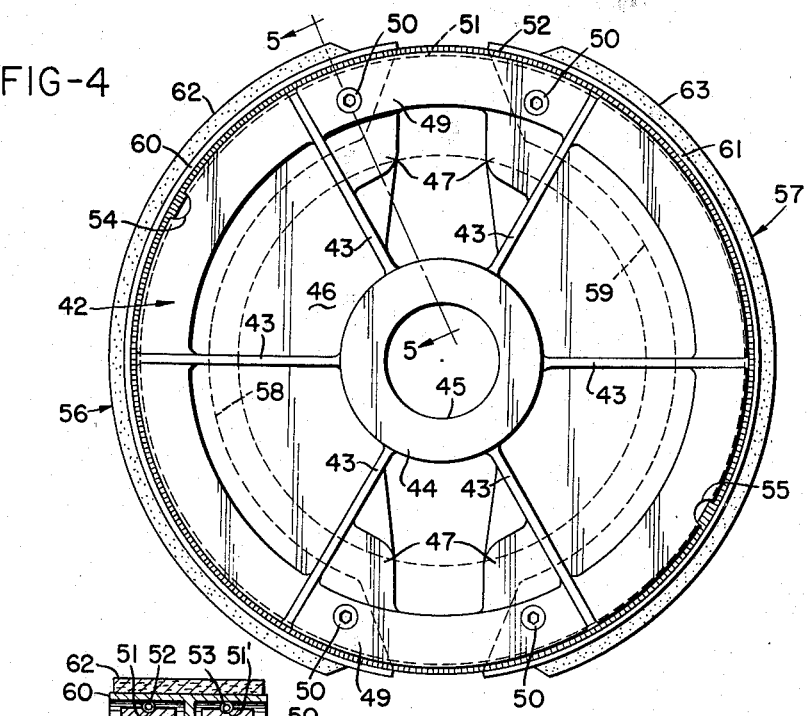
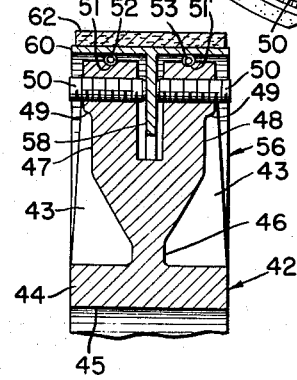
INVENTOR.
HARRY B. BARRETT
BY *Alfred W. Petchaft*
ATTORNEY

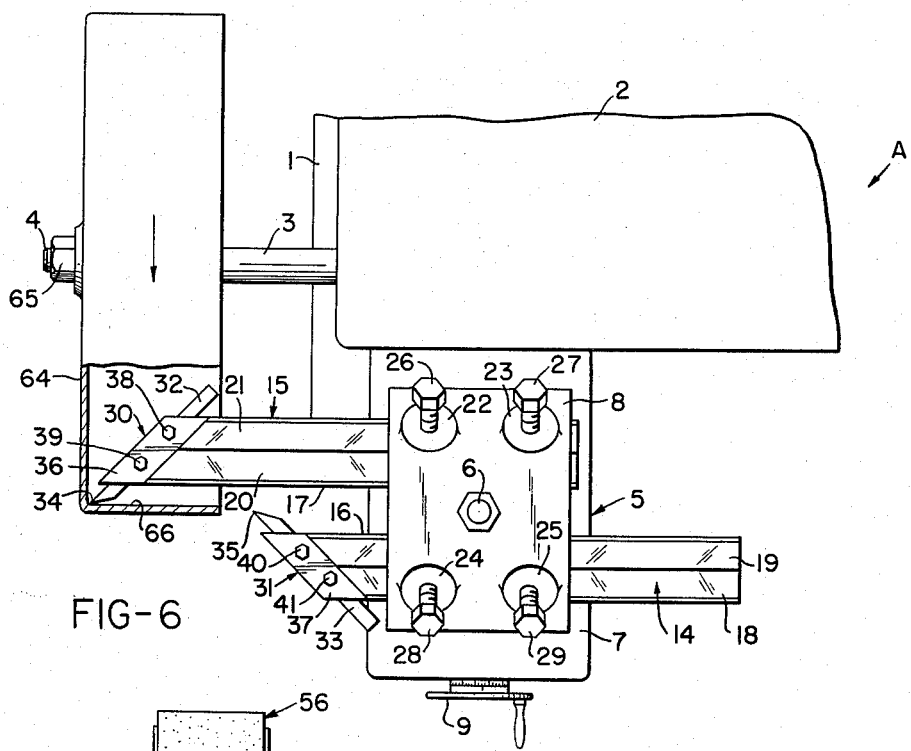
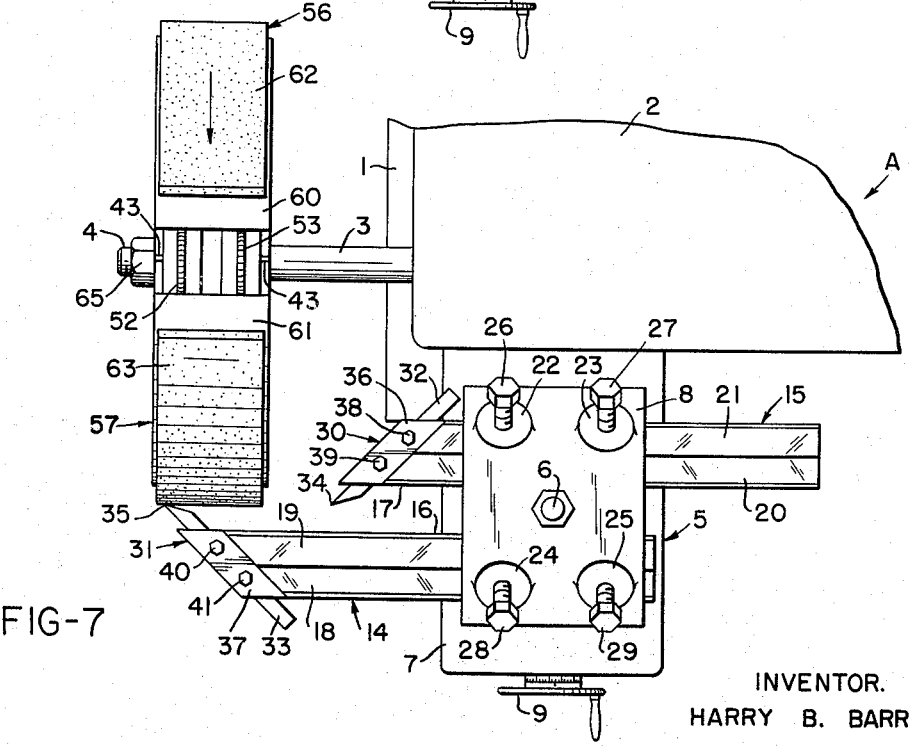

_United States Patent Office_

2,960,765
Patented Nov. 22, 1960

2,960,765

METHODS AND APPARATUS FOR FINISHING BRAKE SHOES AND BRAKE DRUMS

Harry B. Barrett, Clayton, Mo.
(2101 Cass Ave., St. Louis 6, Mo.)

Filed Mar. 8, 1957, Ser. No. 644,832

6 Claims. (Cl. 29—428)

This invention relates in general to certain new and useful improvements in automotive brake repairing equipment and, more particularly, to a method and apparatus for finishing brake shoes and brake drums.

It is established practice in the repair and maintenance of automotive brake systems, particularly after the brake shoes have been relined, to finish the brake shoe contacting surface of the brake drum and the drum contacting surface of the shoe so as to apply a truly concentric and diametrally equal surface to each, and thereby insure proper braking contact of the shoe and drum when the brake is actuated during use. Various types of precision equipment are available for finishing the shoes and drums, and this equipment produces a highly satisfactory and accurate result. However, the proper utilization of such equipment requires a high degree of training and skill on the part of the operator and, in fact, the operator must have the training and skill of an experienced machinist. The ordinary automotive repair shop, however, cannot afford to employ machinists, and, although most automobile repair mechanics are highly skilled workmen, the diversity of repair work and the speed with which it must be performed does not allow for the application of conventional machine shop practice. For the repair of automobile brakes, therefore, it is necessary to have simple repair tools and equipment which can be operated by ordinary garage mechanics but which is, nevertheless, inherently capable of turning out high-precision work.

It is, therefore, a primary object of the present invention to provide a simple, efficient method and means for finishing brake shoes and brake drums whereby to produce precision-fitted shoes and drums.

It is also an object of the present invention to provide a method of the type stated which can be employed by a mechanic having only a limited degree of skill and which produces high-precision results.

It is a further object of the present invention to provide novel brake surfacing equipment which permits precision surfacing of brake shoes and brake drums to accurately matched dimensions.

It is another object of the present invention to provide a brake surfacing machine of the type stated which is correlated in a simple, easily understandable manner but is, nevertheless, adapted for carrying out precisely integrated brake surfacing operations.

It is also an object of the present invention to provide a novel, fully integrated method for surfacing automotive brakes which can be very simply carried out and which minimizes the possibilities for error or miscalculation.

With the above and other objects in view, my invention resides in the novel features of form, construction, arrangement, and combination of parts presently described and pointed out in the claims.

In the accompanying drawings—

Fig. 1 is a fragmentary top plan view of brake shoe and brake drum surfacing equipment constructed in accordance with and embodying the present invention;

Fig. 2 is a fragmentary sectional view taken along line 2—2 of Fig. 1;

Fig. 3 is a fragmentary sectional view taken along line 3—3 of Fig. 2;

Fig. 4 is a top plan view of a brake shoe fixture forming a part of the present invention and showing the brake shoes mounted thereon;

Fig. 5 is a fragmentary sectional view taken along line 5—5 of Fig. 4;

Fig. 6 is a fragmentary top plan view, partly broken away and in section, of the surfacing equipment set up for surfacing a brake drum; and Fig. 7 is a fragmentary top plan view similar to Fig. 6, and showing the surfacing equipment set up for surfacing a brake shoe.

Referring now in more detail and by reference characters to the drawings, which illustrate practical embodiments of the present invention, A designates a lathe which may be of the type shown in my United States Patent No. 2,663,975, comprising a base 1 and housing 2 which rotatably supports a longitudinally extending spindle 3 having a diametrally threaded end portion 4, and mounted on the base 1 for shiftable movement to and fro in a direction parallel to the axis of the spindle 3 is a carriage 5. Bolted at 6 to a slide plate 7 is a tool post 8 of cast iron or the like, the tool post 8 and slide plate 7 being shiftable at right angles to the axis of the spindle 3 through a suitable cross feed assembly (not shown) by means of a hand wheel 9.

The tool post 8 is provided with a pair of spaced parallel bores 10, 11, having diametrally enlarged center portions 12, 13, respectively, and adapted to slidably receive a pair of tool holders 14, 15, each having shanks 16, 17, provided with a pair of adjacent lengthwise extending flat surfaces 18, 19, 20, 21. Formed on the tool post 8 are four tapped bosses 22, 23, 24, 25, which threadedly receive angularly inclined set screws 26, 27, 28, 29, the ends of which are adapted to bear against one or the other of the flat surfaces 18, 19, 20, 21, on the shanks 16, 17, so as to secure the tool holders 14, 15, rigidly in any selected position of lengthwise adjustment within the bores 10, 11. The forward ends of the tool holders 14, 15, are angularly cut off in opposite directions and are provided with angularly extending slots 30, 31, for reception of a pair of opposed tools 32, 33, having cutting tips 34, 35, which are presented toward each other. Also at their forward ends and adjacent the flat surfaces 18, 19, 20, 21, the tool holders 14, 15, are cut down in the provision of forwardly extending flanges 36, 37, which are tapped for reception of set screws 38, 39, 40, 41, the latter being adapted to bear against the tools 32, 33, and secure them within the slots 30, 31.

Referring now to Figs. 4 and 5, 42 designates a brake shoe fixture plate having a plurality of integral reinforcing ribs 43 and a central hub 44 provided with a concentric smooth bore 45. Formed integrally with, and extending radially outwardly from, the hub 44 is a central web 46, the outer end of which is provided with a pair of spaced parallel annular flanges 47, 48, each having a plurality of raised bosses 49 which threadedly receive set screws 50. The outer periphery of the flanges 47, 48, are provided with circumferentially extending grooves 51, 51', which receive coil springs 52, 53, the latter projecting in part radially outwardly from the outer periphery of the flanges 47, 48, all for purposes presently more fully appearing. As seen by reference to Fig. 4, the outer edges of the flanges 47, 48, are each provided with notches 54, 55, which permit easy removal of the springs 52, 53, from the grooves 51, 51'.

Mounted on the fixture plate 42 is a pair of brake shoes 56, 57, having flanges 58, 59, and rims 60, 61, the latter having linings 62, 63, bonded or riveted thereto, the flanges 58, 59, being positioned in the space between the annular flanges 47, 48, and held therein by the set screws 50. The inner surface of the rims 60, 61, rest on the springs 52, 53, which act to shim the shoes 56, 57. In this connection, it should be noted that springs 52, 53, are employed when the shoes 56, 57, are of the Bendix type, but are removed when Chevrolet type shoes are used, since the rims on the Chevrolet type shoe are thicker than rims on the Bendix type shoe. Therefore, with either type brake shoe mounted on the fixture plate 42, the outer edges of the linings 62, 63, may be positioned at substantially the same distance radially outwardly of the center of the fixture plate 42. It should also be noted that since most automotive brake systems currently in use today employ either 10", 11", or 12" shoes and drums, the fixture plate 42 is designed for one size shoe and, consequently, an appropriately sized fixture plate must be selected depending upon the size of brake shoe to be finished.

In use, the set screws 26, 27, 28, 29, are loosened just enough to permit shifting of the tool holders 14, 15, within the bores 11, 12, and, similarly, the set screws 38, 39, 40, 41, are loosened to permit movement of the tools 32, 33, within the slots 30, 31. The tools 32, 33, are then adjusted so that their cutting tips 34, 35, just barely contact each other, whereupon the set screws 38, 39, 40, 41, are tightened to lock the tools 32, 33, in place. It will, therefore, be apparent that as the tool holders 14, 15, are axially shifted within the bores 11, 12, and locked in any desired position by the set screws 26, 27, 28, 29, the cutting tips 34, 35, will always remain at an equal distance radially outwardly of the axis of the lathe spindle 3. A brake drum 64 (Fig. 6) is then mounted on the spindle 3 and held thereon by a retaining nut 65. The tool holder 15 is then shifted toward the drum 64 while the tool holder 14 is withdrawn to the positions shown in Fig. 6, whereupon the set screws 26, 27, 28, 29, are tightened. The carriage 5 and tool post 8 are then adjusted so that the cutting tip 34 of the tool 32 is at the innermost face of the drum 64, also as shown in Fig. 6. The tip is finally fed outwardly to the proper radial distance from the spindle 3 for the desired depth of cut to be taken from the brake drum face 66, such cut being just deep enough to make a clean, continuous cut and remove all ridges, grooves or other surface imperfections. As is familiar to brake repair mechanics, if the first cut is not quite deep enough to remove all scar marks, grooves and the like, it may be necessary to take a second cut, the purpose being to take off just enough metal to leave the drum surface smooth and concentric. The finished brake drum 64 is then removed from the spindle 3 leaving the tool 32 and carriage 5 in the exact adjustment radially outwardly from the center line of the spindle 3 at which the brake drum was finally surfaced. The set screws 26, 27, are loosened and the tool holder 15 is withdrawn to the position shown in Fig. 7. The fixture plate 42, with the brake shoes 56, 57, positioned thereon, is then mounted on the spindle 3 and secured in place by the nut 65. The tool holder 14 is then shifted to the position shown in Fig. 7, and a cut taken from the drum contacting surfaces of the lining 62, 63. It will be apparent that since the cutting tips 34, 35, are each spaced at precisely the same distance radially outwardly of the axis of the spindle 3, the drum contacting surfaces of the linings 62, 63, and the lining contacting surface 66 of the drum 64 will be precisely equal, thereby insuring proper braking contact when the brake is actuated during use.

It should be understood that various changes and modifications in the form, construction, arrangement, and the combination of the several parts of the apparatus and in the several steps of the method may be made and substituted for those herein shown and described without departing from the nature and principle of my invention.

Having thus described my invention, what I claim and desire to secure by Letters Patent is:

1. The method of forming matching contact surfaces on coacting elements of an automotive brake in which said coacting elements are a brake drum and brake shoe, said method comprising the steps of: positioning two cutting edges equidistant from a predetermined line, rotating one of said brake elements about an axis formed by said predetermined line, moving one of said cutting edges along a line of in-feed which is parallel to said predetermined line into contact with the rotating element to form a cylindrical braking surface thereon, retracting said one cutting edge from the braking surface along a line of out-feed which is parallel to said predetermined line, rotating the other of said brake elements about said predetermined line, moving the other of said cutting edges into contact with said other rotating brake element along a line of in-feed which is parallel to said predetermined line to form a cylindrical braking surface thereon which precisely matches the braking surface so formed on said one element, and thereupon assembling the brake shoe and brake drum elements to form an automotive brake.

2. The method of forming matching contact surfaces on coacting elements of an automatic brake in which said coacting elements are a brake drum and brake shoe, said method comprising the steps of: positioning two cutting edges equidistant and in the same direction from a predetermined line, rotating one of said brake elements about an axis formed by said predetermined line, moving one of said cutting edges along a line of in-feed which is parallel to said predetermined line into contact with the rotating element to form a cylindrical braking surface thereon, retracting said one cutting edge from the braking surface along a line of out-feed which is parallel to said predetermined line, rotating the other of said brake elements about said predetermined line, moving the other of said cutting edges along a line of in-feed which is parallel to said predetermined line into contact with said other rotating brake element to form a cylindrical braking surface thereon which precisely matches the braking surface so formed on said one element, and thereupon assembling the brake shoe and brake drum elements to form an automotive brake.

3. The method of forming matching contact surfaces on coacting brake shoes and brake drums, said method comprising the steps of: positioning two cutting edges equidistant from a predetermined line, rotating the brake drum about an axis formed by said predetermined line, moving one of said cutting edges along a path parallel to said axis and into contact with the rotating element to form a cylindrical braking surface thereon, retracting said one cutting edge from the braking surface along a path parallel to said axis, rotating the brake shoes about said axis, moving the other of said cutting edges along a path parallel to said axis and into contact with said other rotating brake element to form a cylindrical braking surface thereon which precisely matches the braking surface so formed on said one element, and assembling said matched drums and shoes as coacting elements in brake assembly.

4. The method of forming matching contact surfaces on coacting brake shoes and brake drums, said method comprising the steps of: positioning two cutting edges equidistant and in the same direction from a predetermined line, rotating the brake drums about an axis formed by said predetermined line, moving one of said cutting edges along a path parallel to said axis and into contact with the rotating element to form a cylindrical braking surface thereon, retracting said one cutting edge from the braking surface along a line parallel to said axis, rotating the brake shoes about said axis, moving the other of said cutting edges along a path coincident with the path of movement of said one cutting edge and into contact with said other rotating brake element to form a cylindrical braking surface thereon which precisely matches the braking surface so formed on said one element, and assembling said matched drums and shoes as coacting elements in brake assembly.

5. The method of forming matching contact surfaces on coacting brake shoes and brake drums, said method comprising the steps of: positioning two oppositely presented cutting edges in touching relation along the same line, and at a predetermined distance from an axis of rotation, shifting said cutting edges away from each other so that one of said cutting edges is in position to make a cut, rotating the brake drum about said axis of rotation, moving said last-mentioned cutting edge along a path of in-feed which is parallel to said axis of rotation and into contact with said rotating element whereby to form a cylindrical braking surface thereon, retracting said last mentioned cutting edge from said braking surface, rotating the brake shoes about said axis, moving the other of said cutting edges along said path of in-feed and into contact with the rotating brake shoes to form a cylindrical braking surface thereon diametrally equal to the braking surface so formed on said one element, and assembling said matched drums and shoes as coacting elements in brake assembly.

6. The method of forming matching contact surfaces on the coacting elements of an automotive brake in which said coacting elements are a brake drum and brake shoe, said method comprising the steps of: mounting two separate cutting tools in a carrier so that the cutting tool can be moved simultaneously toward and away from a predetermined axis whereby to vary the radial distance between the cutting tools and said axis, adjusting said cutting tools up on the carrier so that the cutting edges of the cutting tools are in touching relation along a single line parallel to said axis, shifting said cutters along said line relatively to each other so that the cutting edges of the cutters are out of touching relationship and the cutting edge of one of said cutters is in position for making a cut, rotating one of said elements about the axis moving the last mentioned cutter along a line of in-feed which is parallel to the axis into contact with such rotating element to form a cylindrical braking surface thereon, retracting said last mentioned cutter from the braking surface along a line of out-feed which is parallel to the axis, rotating the other of said brake elements about said axis, moving the other of said cutters into contact with said last mentioned braking element along the same line of in-feed to form a cylindrical surface thereon which precisely matches the braking surface so formed on the companion element, and thereupon assembling the brake shoe and brake drum elements to form an automotive brake.

References Cited in the file of this patent

UNITED STATES PATENTS

| | | |
|---|---|---|
| 735,138 | Normand | Aug. 4, 1903 |
| 1,323,092 | Palmer | Nov. 25, 1919 |
| 1,629,427 | Whitworth | May 17, 1927 |
| 1,708,405 | Aff | Apr. 9, 1929 |
| 1,733,578 | Burke | Oct. 29, 1929 |
| 1,791,546 | Wise | Feb. 10, 1931 |
| 2,050,828 | Buell | Aug. 11, 1936 |
| 2,213,040 | Drissner | Aug. 27, 1940 |
| 2,714,514 | Hohwart | Aug. 2, 1955 |
| 2,787,824 | Kaczor | Apr. 9, 1957 |
| 2,819,417 | Glass | Jan. 7, 1958 |